Jan. 5, 1971     P. A. ARGARBRIGHT ET AL     3,553,121
ESTER MODIFIED URETHANE DRYING OILS
Filed Feb. 25, 1969
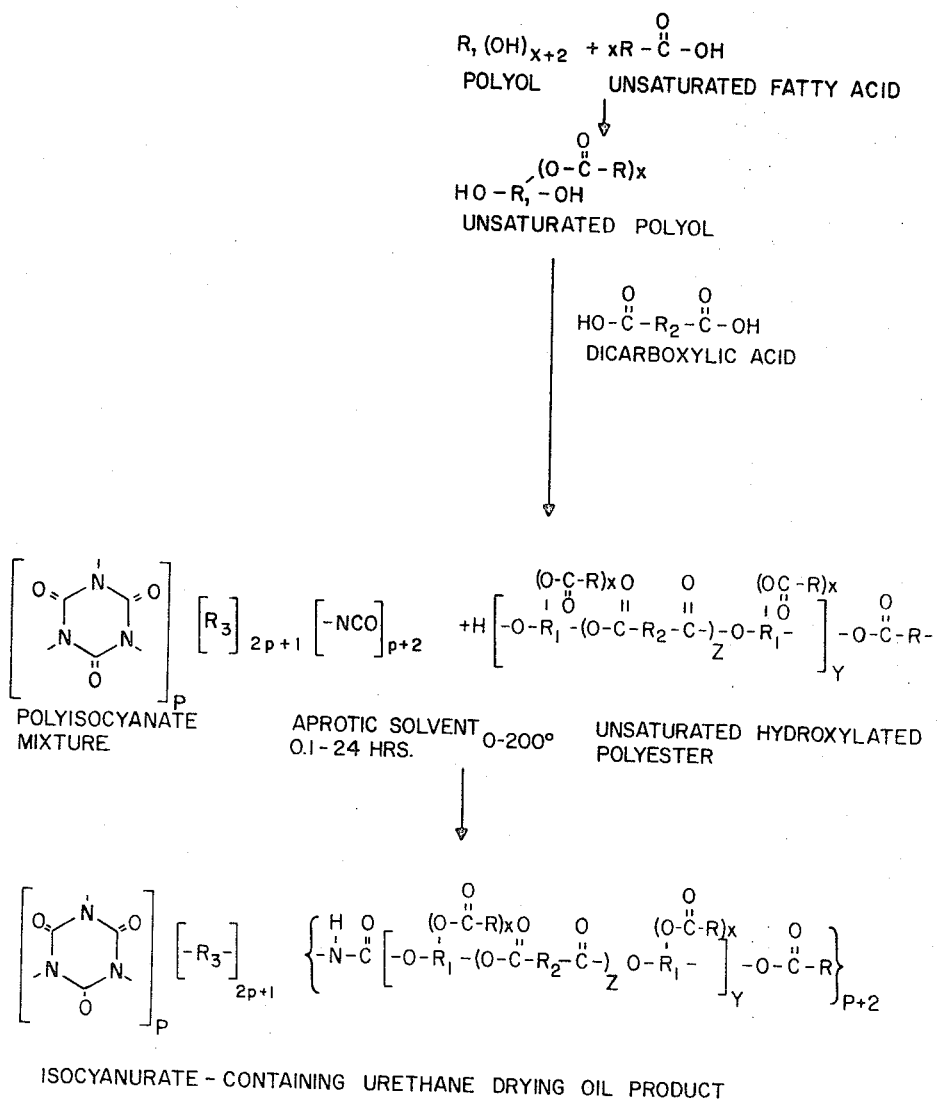
INVENTORS
PERRY A. ARGABRIGHT
BRIAN L. PHILLIPS
VERNON J. SINKEY
BY
ATTORNEY

United States Patent Office 3,553,121
Patented Jan. 5, 1971

3,553,121
ESTER MODIFIED URETHANE DRYING OILS
Perry A. Argabright and Brian L. Phillips, Littleton, Colo., and Vernon J. Sinkey, Inver Grove Heights, Minn., assignors to Marathon Oil Company, Findlay, Ohio, a corporation of Ohio
Filed Feb. 25, 1969, Ser. No. 802,054
Int. Cl. C09d 3/64, 3/68, 3/72
U.S. Cl. 260—22
6 Claims

ABSTRACT OF THE DISCLOSURE

Unsaturated isocyanurate-containing urethane drying oils, and a method of preparing same, by reacting hydroxylated polyesters with the products from organic dihalides and metal cyanates. The hydroxylated polyesters preferably comprise reaction products of a diacid or anhydride and hydroxyl-containing esters of polyols and unsaturated fatty acids.

CROSS REFERENCES TO RELATED APPLICATIONS

U.S. Pat. application Ser. No. 611,588 filed Jan. 25, 1967, now U.S. Pat. No. 3,458,448, issued July 29, 1969, and Ser. No. 786,405 filed Dec. 23, 1968 and Ser. No. 802,215 filed Feb. 25, 1969 and Ser. No. 514,721 filed Dec. 17, 1965, relate to the general field of the present invention.

BACKGROUND OF THE INVENTION

Urethane drying oils offer advantages as coatings for wood and other surfaces where superior resistance to abrasion, chemical attack, and weathering is required. Various methods of preparing such oils are known. One method involves the preparation of hydroxyl containing partial esters of unsaturated fatty acids via the transesterification of a drying oil with a polyol. A di-isocyanate is then reacted with the drying oil derivative to give a urethane drying oil. Urethane drying oils prepared by this method, using commercially available aryl diisocyanates, have a number of disadvantages, chief among which are their tendency to discolor and undergo degradation, especially when exposed to sunlight and weathering.

FIG. 1 shows reactions which are involved in preferred embodiments of the present invention.

SUMMARY OF THE INVENTION

In accordance with the present invention, urethane drying oils have been evolved which not only demonstrate excellent resistance to sunlight and weathering, but also manifest excellent resistance to abrasion and attack by chemicals such as acids and alkalis. Briefly, the urethane drying oils of this invention comprise reaction products of multi-functional isocyanates, including isocyanurate derivatives, and hydroxylated polyesters. The hydroxylated polyesters utilized in carrying out the reaction are derived from the reaction of a polycarboxylic acid, particularly a diacid, or the anhydride thereof, with a hydroxyl-containing partial ester. The resulting drying oils consist primarily of a mixture of compounds having the formula shown as product in FIG. 1; wherein R is a monovalent unsaturated hydrocarbon radical, preferably an aliphatic radical, containing from 1 to 5, especially desirably 1 to 3, double bonds, and having from 5 to 30, preferably 10 to 20 carbon atoms; $R_1$ is a polyvalent organic radical, especially an unsaturated or saturated aliphatic radical, or an aryl radical; $R_1$ may bear from 2 to 10 hydroxyl groups, preferably from 2 to 4; $R_2$ is a divalent organic radical, saturated or unsaturated containing from 2 to 20 carbons, preferably from 2 to 10 carbons; $R_3$ is an organic-divalent radical to which is attached the nitrogen atoms of the isocyanate and isocyanurate groups. $R_3$ may be saturated or unsaturated and preferably the carbons to which the nitrogens are attached are benzylic or allylic. $R_3$ contains from 2 to 30, preferably 2 to 20, and most preferably 2 to 12 carbon atoms. X is 1 to 5, especially desirably 1 to 3; and Y is 1 to 5, preferably 1 to 3; and Z is 0 or 1; and $p$ is the number of isocyanurate groups which preferably averages from about 0.1 to about 15, more preferably from 0.5 to 10, and most preferably from 1 to 3. It should be understood that the R, $R_1$, $R_2$, and $R_3$ radicals or groups may be substituted or unsubstituted. In those instances where substituents are present on the radicals or groups, they should be non-interfering in character both from the standpoint of steric factors as well as chemical reactivity considerations. The hydroxyl-containing partial esters having utility in forming the hydroxylated polyesters employed in the preparation of drying oils in accordance with the practice of the present invention advantageously are unsaturated partial esters containing either primary or secondary hydroxyl groups. More specifically, and especially desirably, the esters used as starting materials are hydroxyl-containing unsaturated partial esters of fatty acids which contain either primary or secondary hydroxyl groups, with primary hydroxyl groups being preferred. Preparation of such hydroxyl-containing unsatuated partial esters can be carried out by the partial transesterification of unsaturated fatty acid esters (a vegetable oil) with a suitable polyol in the presence of a catalyst. The unsaturated fatty acid esters used in the partial transesterification reaction correspond generally to the formula:

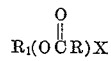

wherein $R_1$ is derived from a polyol exemplified by ethylene glycol, glycerol, trimethylol propane, pentaerythritol, and the like, and wherein the

group is derived from an unsaturated fatty acid such as those normally occurring in linseed oil, soybean oil, cottonseed oil, dehydrated castor oil, tung oil, safflower oil, peanut oil, or various fish oils, and the like, or wherein said group is derived from unsaturated fatty acids, such as oleic, linoleic, linolenic, palmitoleic, ricinoleic, and the like, and mixtures thereof. The aforementioned oils may be modified by alkali refining, blowing, or heat bodying.

The polyol utilized in carrying out the partial transesterification reaction can be selected from two separate classes of compounds: (1) low molecular weight polyols exemplified by ethylene glycol, glycerol, trimethylol propane, pentaerythritol, and the like, and those corresponding to the formulae:

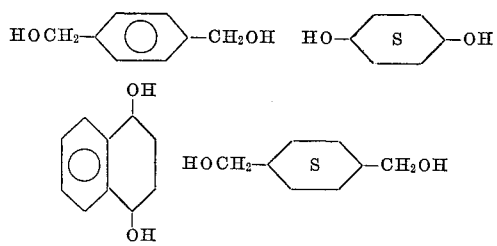

and the like, and their non-interfering substituted derivatives; and (2) polymeric polyols such as polyether polyols, polyester polyols, polyurethane polyols, and polychlorohydrins having terminal hydroxyl groups. By polymeric polyols is meant a conventional polyether or polyester containing hydroxyl groups and having a molecular weight of from about 300 to about 5000, and polyurethane polyols such for example as the polymer derived from hexamethylene diisocyanate and ethylene glycol, or the one derived from trimethylol propane and p-xylylene diisocyanate.

The catalysts used in carrying out the transesterification reaction between the esters and the polyols include lead oxide, calcium naphthenate, sodium hydroxide, potassium hydroxide, calcium oxide, and similar commercial catalysts. Of this group, lead oxide and calcium naphthenate are preferred.

As indicated hereinabove, the hydroxylated polyesters utilized in forming the drying oils of the present invention are prepared by reacting a hydroxyl-containing ester of the type described with a polycarboxylic acid or the anhydride thereof. Exemplary of acids and anhydrides which can be used for this purpose are saturated and unsaturated aliphatic dicarboxylic acids such as malonic acid, malic acid, succinic acid, tartaric acid, glutaric acid, adipic acid, pimelic acid, citracinic acid, fumaric acid, maleic acid, and the like, and the anhydrides thereof; and dicarboxylic aromatic acids such as terephthalic acid, phthalic acid, isophathalic acid, uvitic acid, cumidinic acid, and the like, and anhydrides of such acids. The reaction between the product of the transesterification reaction and the acid or acid anhydride is in the nature of an esterification-condensation reaction and is such that a portion at least of the free reactive hydroxyl groups of the transesterification reaction product is left unreacted. These free hydroxyl groups are available for reaction with a multi-functional isocyanate to provide the urethane drying oils of the present invention.

The multi-functional isocyanates having utility for the purposes of this invention are isocyanurate-containing polyisocyanates. The isocyanurate-containing polyisocyanates which can be used advantageously are of the type corresponding generally to the formula:

$$[-R_3-]_{2p+1} [-NCO]_{p+2}$$

wherein nitrogen-nitrogen bonds are not allowed and $R_3$ is a divalent alkyl or substituted divalent alkyl radical, for example;

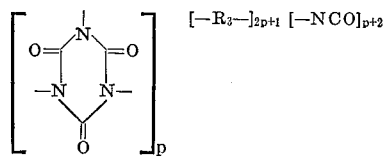

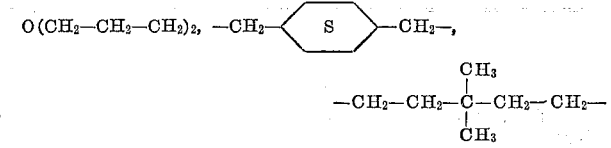

The preparation of such multifunctional isocyanates is described in co-pending application Ser. No. 611,588, filed Jan. 25, 1967. Briefly, their preparation involves the steps of forming a reaction mixture of an inorganic bromide (or iodide), an organic chloride, and an alkali or alkaline earth metal cyanate, and carrying out the reaction between the bromide, the organic chloride, and the metal cyanate in the presence of an aprotic solvent at a temperature in the range of from about 25° C. to about 300° C., and at pressures of the order of about 0.1 to 30 atmospheres, and preferably in an inert atmosphere.

It is especially desirable that the isocyanate be in the form of a mixture in which about 10 to about 75 (more preferably 20 to 55, and most preferably 30 to 45 mole percent) of the —NCO groups are present in the form of isocyanurate rings.

The proportions of hydroxylated polyester to multifunctional isocyanate utilized is somewhat variable, preferably 1.2 to 0.5; more preferably 1.1 to 0.7; and most preferably 1.0 to 0.9 moles of hydroxyl should be present for each mole of isocyanate. The generally optimum objectives of the invention are attained, however, with a hydroxyl to isocyanate mole ratio of about 1:1, with especially satisfactory results being obtained when the isocyanate is used in slight excess.

The reaction between the hydroxyl-containing polyester and the multifunctional isocyanate can be carried out at temperatures of the order of about 0° C. to about 200°, usually from about 25° C. to about 100° C. A solvent, which must be aprotic to avoid interferences, is advantageously employed as a medium for the reaction. Aprotic solvents having utility in this connection are characterized in that they do not contain active hydrogen atoms as determined by the Zerewitinoff method. Dipolar aprotic solvents are particularly useful since they are often employed in preparing the multifunctional isocyanate component and the isolation of this reactant is thereby obviated. Specific examples of solvents useful for the purpose of this invention are dipolar aprotic solvents such as N,N-dimethylformamide, N-methylpyrrolidone, dimethyl sulfoxide, hexamethyl phosphoramide, acetonitrile, and benzonitrile; ketonic solvents such as methyl ethyl ketone and methyl isoamyl ketone; esters such as 2-ethoxyethyl acetate, ethyl acetate, and amyl acetate; and hydrocarbon solvents, for example mineral spirits, varnish makers and painters naphtha, xylene, and toluene.

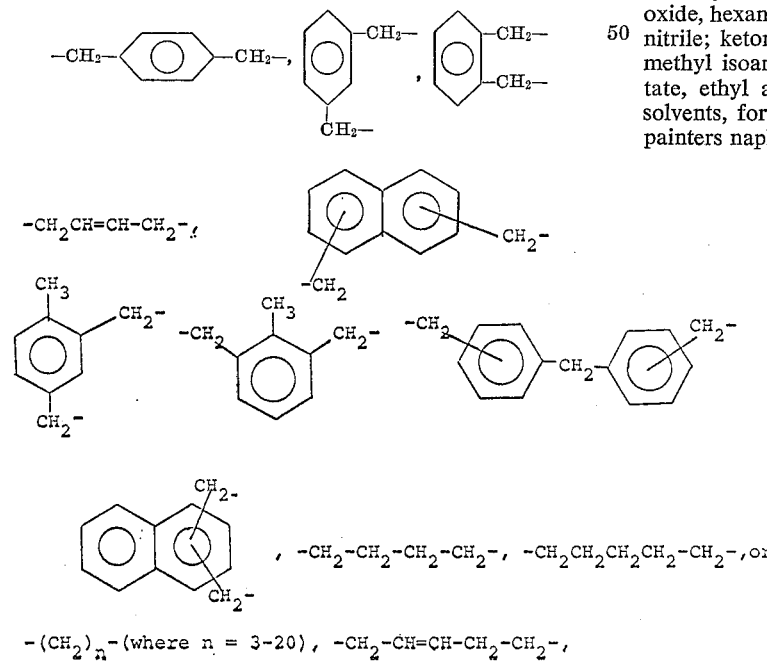

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed in any way as limitative of the scope of the invention.

EXAMPLE I 220 g. of safflower oil (0.25 mole) is mixed with 34.0 g. of pentaerythritol (0.25 mole) in a resin pot equipped with an overhead stirrer, nitrogen inlet and thermometer. Nitrogen is bubbled through the mixture at 0.04 cu. ft./ gal. min. and the temperature is raised to 235° C. Upon reaching temperature, 0.68 g. of calcium octoate catalyst is added. After stirring for 50 minutes at temperature, 37 g. phthalic anhydride (0.25 mole) is added and the mixture stirred for an additional 3 hours at 235° C. The solution is then cooled to room temperature and analyzed. Acid No.=2.69; Hydroxyl No.=121. A mixture of 42.6 g. of the above product and 0.4 g. dibutyltin dilaurate are added dropwise over a 3 hour period to 15 g. of an isocyanurate-containing multifunctional isocyanate in 15 g. of benzene. (The isocyanurate-containing polyisocyanate is prepared by reacting p-xylene dichloride with potassium cyanate in dry dimethylformamide (DMF) in the presence of a sodium bromide catalyst at a temperature of 140° C. for 8 minutes in accordance with the method described in said co-pending application Ser. No. 611,588. The polyisocyanate contains 6.1 meg. NCO/g.) The temperature is raised to 45° C. and as the mixture thickens more benzene is added. The reaction is continued until free isocyanate is not detected by infrared spectroscopy. The benzene is then removed and the resin dissolved in xylene. The xylene solution is then treated with NaHSO$_4$, filtered and the solids content adjusted by removing some of the xylene. 0.2% Pb and 0.02% Co in the form of the naphthenates are then added as driers.

The resulting coating solution has the following properties: Gardner viscosity=G at 46% solids; Gardner color=6.

This coating solution is then applied to a steel panel, four mils wet thickness. Tests of the coating show the following properties:

Tack free time: 1 hour
Sward Hardness:
 1 day: 28
 3 days: 38–44
 5 days: 32–44
 7 days: 34–46
Forward impact: passes 120 in. lb.
Reverse impact: passes 120 in. lb.
Conical Mandrel: passes ⅛ inch

EXAMPLE II

Employing the procedure described in Example I, 220 g. of safflower oil is reacted with 34 g. of pentaerythritol and 25.9 g. of phthalic anhydride (0.175 mole). 50 g. of the above hydroxyl containing glycerides are then reacted with 19.3 g. of the isocyanurate containing isocyanate described in Example I using methyl ethyl ketone as solvent for the reaction. The resulting product is formulated into a coating solution having the following properties:

Gardner viscosity: M at 56% solids in xylene
Gardner color: 11

This coating solution is then applied to a steel panel and tested, showing the following properties:

Tack free time: 2 hours
Sward Hardness:
 1 day: 10
 3 days: 22
 5 days: 26
 7 days: 32
Forward impact: passes 120 in. lb.
Reverse impact: passes 120 in. lb.
Mandrel: passes ⅛ inch

EXAMPLE III

Using the procedure of Example 1, 220 g. of safflower oil is reacted with 34.0 g. of pentaerythritol and 55.5 g. of phthalic anhydride (0.375 mole). 70 g. of the above hydroxyl containing glycerides are then reacted with 10.4 g. of the isocyanurate containing isocyanate described in Example I using methyl ethyl ketone as solvent for the reaction. The resulting product is formulated into a coating solution having the following properties:

Gardner viscosity: H at 64% solids in xylene
Gardner color: 8

This coating solution is then applied to a steel panel and tested, showing the following properties:

Tack free time: 30 hours
Sward Hardness:
 3 days: 2
 5 days: 16
 7 days: 18
Forward impact: passes 120 in. lb.
Reverse impact: passes 120 in. lb.
Mandrel: passes ⅛ inch

EXAMPLE IV

Safflower oil (220 g.) and pentaerythritol (34 g.) were mixed in a resin pot with a slow nitrogen stream, and the mix heated to 235° C. Calcium octoate (0.68 g.) was added and the mixture heated at temperature for 50 minutes. After this time, the pot was cooled to 150° C., and chlorendic anhydride (92.8 g.) was added. The mixture was stirred at 150° C. for 3 hours.

The thus prepared alcoholysis mix (50 g.) was dissolved in 100 ml. methyl ethyl ketone, 0.6 g. dibutyl tin dilaurate catalyst was added and the mix heated to 45° C. The isocyanurate containing polyisocyanate (11.9 g.) described in Example I was dissolved in 50 ml. methyl ethyl ketone and the solution added dropwise over a 2 hour period. The reaction mixture was stirred an additional 2 hours to complete the reaction and the methyl ethyl ketone removed. The resultant resin was formulated in xylene.

Gardner viscosity: Q (59% solids)
Gardner color: 6

Formulated with 0.02% cobalt, 0.2% lead driers

Tack free time: 1 hour
Sward Hardness:
 1 day: 6
 7 days: 28
Forward impact: passes 120 in. lb.
Reverse impact: passes 120 in. lb.
Conical Mandrel: passes ⅛ inch

EXAMPLE V

Safflower oil (220 g.) and pentaerythritol (34 g.) were mixed in a resin pot with a slow nitrogen stream, and the mix heated to 235° C. Calcium octoate (0.68 g.) was added and the temperature held at 235° C. for 1 hour. 2,6-dicarbomethoxy-naphthalene (61 g.) was added and heating continued for an additional 4 hours.

To 50 g. of the above alcoholysis mix in 100 ml. methyl ethyl ketone with 0.5 g. dibutyl tin dilaurate was added over a 2 hour period, a solution of 13.3 g. of the isocyanurate containing polyisocyanate described in Example I in 50 ml. methyl ethyl ketone. The reaction temperature was maintained at 45° C. for an additional 3 hours to complete the reaction. After removal of methyl ethyl ketone, the resin was formulated in xylene.

Gardner viscosity: V (70% solids)
Gardner color: 10

Formulated with 0.02% cobalt, 0.2% lead driers

Tack free time: 4 hours
Sward Hardness:
  1 day: 4
  7 days: 18
Forward impact: passes 120 in. lb.
Reverse impact: passes 120 in. lb.
Conical Mandrel: passes ⅛ inch

What is claimed is:

1. A method for producing urethane drying oils containing unsaturation having a formula corresponding to:

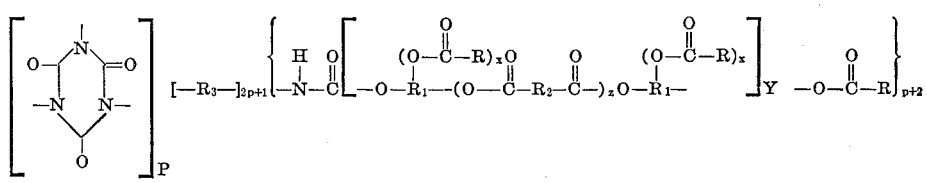

wherein R is a monovalent unsaturated hydrocarbon radical containing from 1 to 5 double bonds and having from 5 to about 30 carbon atoms; $R_1$ is a polyvalent hydrocarbon radical containing from 1 to about 20 carbon atoms; $R_2$ is a divalent organic radical selected from the group consisting of saturated and unsaturated aliphatic radicals, and aromatic radicals; $R_3$ is a xylylene radical; $p$ averages from about 0.1 to about 15; X is 1 to 5; Y is 1 to 5; Z is 0 or 1; consisting essentially of forming a reaction mixture of a hydroxyl-containing ester and a dicarboxylic acid or the anhydride thereof, partially reacting the ester with the polycarboxylic acid or the anhydride to provide a hydroxylated polyester, and contacting at from about 0 to about 200° C. in the presence of an aprotic solvent not containing active hydrogen as determined by the Zerewitinoff method the hydroxylated polyester with an isocyanate mixture in which from about 10 to 75 mole percent of the —NCO groups are present in the form of isocyanurate rings to form an unsaturated isocyanurate-containing urethane drying oil, wherein the hydroxyl-containing ester is a partial ester of an unsaturated fatty acid and a polyol, and mixtures of the foregoing wherein the diacid or anhydride is a member of the group consisting of saturated and unsaturated aliphatic dicarboxylic acids and anhydrides thereof, and dicarboxylic aromatic acids and anhydrides thereof.

2. A method of claim 1 wherein the isocyanate mixture contains compounds in which none of the isocyanate groups or the isocyanate groups are attached directly to a hydrocarbon aromatic ring.

3. The process of claim 1 wherein from about 20 to 55 mole percent of the —NCO groups in the isocyanate mixture are present in the form of isocyanurate rings.

4. Urethane drying oils containing unsaturation produced in accordance with the method of claim 1.

5. A method according to claim 1 wherein hydroxylated polyester is contacted with the isocyanate mixture at a temperature of from about 25° C. to about 125° C.

6. A method according to claim 1 wherein $R_3$ is a p-xylene radical.

References Cited

UNITED STATES PATENTS

| | | | |
|---|---|---|---|
| 3,437,500 | 4/1969 | Hennig et al. | 260—77.5 |
| 3,448,084 | 6/1969 | Burdick et al. | 260—75 |
| 3,458,448 | 7/1969 | Argabright et al. | 252—182 |

FOREIGN PATENTS

| | | | |
|---|---|---|---|
| 947,973 | 1/1964 | Great Britain | 260—22 |
| 6,515,058 | 5/1966 | Netherlands | 260—77.5 |

DONALD E. CZAJA, Primary Examiner

R. W. GRIFFIN, Assistant Examiner

U.S. Cl. X.R.

117—132, 161; 260—30.6, 30.8, 31.2, 32.4, 32.6, 32.8, 33.6, 75, 77.5

UNITED STATES PATENT OFFICE
CERTIFICATE OF CORRECTION

Patent No. 3,553,121      Dated January 5, 1971

Inventor(s) Perry A. Argabright et al.

It is certified that error appears in the above-identified patent and that said Letters Patent are hereby corrected as shown below:

In the Figure, line 5, "UNSATURATED POLYOL" should read -- UNSATURATED POLYOL DIOL --, same figure, note in Box should read

NOTE:    N—N BONDS ABSENT

Y ≠ 0

Claim 1, line 33, "Z is 0 or 1;" should be cancelled.

Signed and sealed this 20th day of June 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,553,121     Dated Jan. 5, 1971

Inventor(s)  P. A. Argabright et al

It is certified that error appears in the above-identified patent and that said Letters Patent are hereby corrected as shown below:

Claim 1: The structure should read as follows:

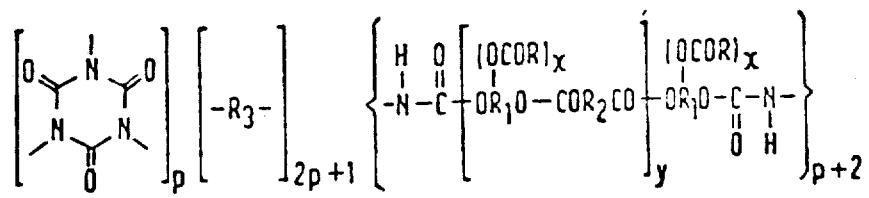

ISOCYANURATE - CONTAINING URETHANE DRYING OIL PRODUCT

In the Figure:

Line 8 should read:

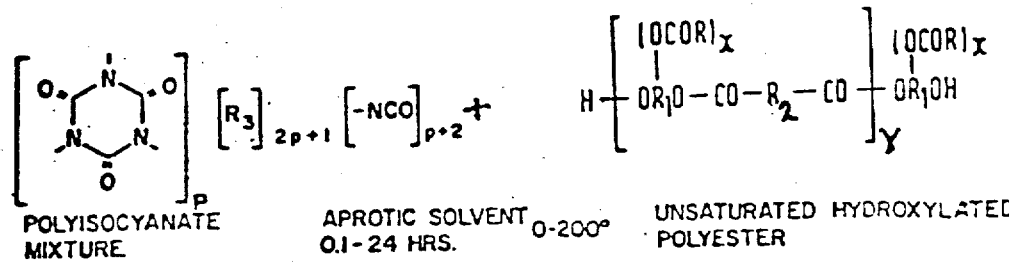

POLYISOCYANATE MIXTURE     APROTIC SOLVENT $0\text{-}200°$ 0.1-24 HRS.     UNSATURATED HYDROXYLATED POLYESTER

PO-1050
(5/69)

UNITED STATES PATENT OFFICE
CERTIFICATE OF CORRECTION

Patent No. 3,553,121          Dated  Jan. 5, 1971

Inventor(s)   P. A. Argabright et al

It is certified that error appears in the above-identified patent and that said Letters Patent are hereby corrected as shown below:

(Page #2)

(Continued from Page #1)

In the Figure:

Line 9:   Should read:

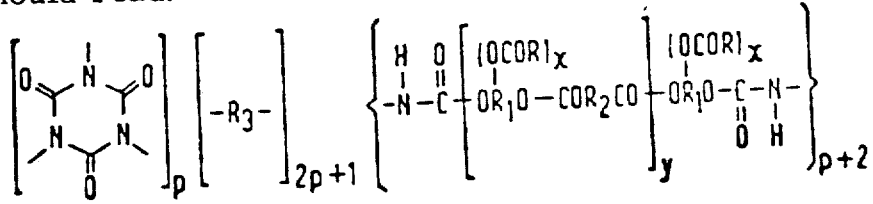

ISOCYANURATE - CONTAINING URETHANE DRYING OIL PRODUCT

Signed and sealed this 26th day of December 1972.

(SEAL)
Attest:

EDWARD M. FLETCHER, JR.
Attesting Officer

ROBERT GOTTSCHALK
Commissioner of Pat(